United States Patent [19]
Bando

[11] Patent Number: 5,888,268
[45] Date of Patent: Mar. 30, 1999

[54] GLASS-PLATE WORKING APPARATUS

[75] Inventor: Shigeru Bando, Tokushima, Japan

[73] Assignee: Bando Kiko Co., Ltd., Tokushima, Japan

[21] Appl. No.: 776,329

[22] PCT Filed: Nov. 14, 1996

[86] PCT No.: PCT/JP96/03348

§ 371 Date: Jan. 27, 1997

§ 102(e) Date: Jan. 27, 1997

[30] Foreign Application Priority Data

May 13, 1996 [JP] Japan .................................... 8-142222

[51] Int. Cl.$^6$ ................................................ C05B 33/02
[52] U.S. Cl. ................ 65/286; 65/174; 65/375; 33/1 M; 83/879; 83/776; 83/523; 83/821
[58] Field of Search .................. 65/160, 166, 167, 65/174, 286, 375, DIG. 13, 29.1, 29.11, 61, 62, 105, 106, 112; 225/93.5; 33/1 M; 83/879, 776, 487, 575, 523, 821, 940, 929, 76.1

[56] References Cited

U.S. PATENT DOCUMENTS 3,978,748  9/1976  Leslie et al. .

5,398,579  3/1995  Bando ........................................ 83/879

FOREIGN PATENT DOCUMENTS

| 0 372 832 | 6/1990 | European Pat. Off. . |
| 2-149441 | 6/1990 | Japan . |
| 3-75496 | 12/1991 | Japan . |
| 7-89740 | 4/1995 | Japan . |
| 7-136985 | 5/1995 | Japan . |

*Primary Examiner*—Steven P. Griffin
*Attorney, Agent, or Firm*—Nixon & Vanderhye

[57] ABSTRACT

A glass-plate working apparatus (A) includes a base (2) on which a glass plate (1) is placed; Y-direction movable bases (3) and (4) which are supported by the base (2) movably in a Y-direction perpendicular to an X-direction; a Y-direction moving device (5) for moving the movable bases (3) and (4) in the Y-direction; a frame (8) which is supported by the Y-direction movable bases (3) and (4) via scuffing preventing devices (6) and (7); an X-direction movable base (9) which is supported by the frame (8) movably in the X-direction; an X-direction moving device (10) for moving the X-direction movable base (9) in the X-direction; and a working head (12) mounted on the X-direction movable base (9) so as to form a cut line (11) for bend-breaking on the glass plate (1).

10 Claims, 6 Drawing Sheets

GLASS-PLATE WORKING APPARATUS

TECHNICAL FIELD

The present invention relates to a glass-plate working apparatus for forming a cut line for bend-breaking in a glass plate, for bend-breaking along the cut line the glass plate on which the cut line has been formed, for grinding and/or polishing a bend-broken edge of the bend-broken glass plate, or concurrently effecting these operations continuously, for effecting taper edge working, round edge working, or the like at the edge of the glass plate, or effecting other working such as surface grinding and/or polishing work at the surface of the glass plate.

BACKGROUND ART

In a glass-plate working apparatus of this type, a working head provided with a tool such as a cutter wheel for effecting desired working on a glass plate is mounted on, for example, an X-direction movable base which is movable in an X-direction, this X-direction movable base is mounted on a frame which is movable in a Y-direction perpendicular to the X-direction, and the X-direction movable base and the frame are moved in the X-direction and the Y-direction, respectively, whereby the working head is moved with respect to the glass plate, thereby to effect working at a desired position on the glass plate by means of the working head.

In the apparatus of the above-described example, the frame on which the X-direction movable base is mounted is supported at its opposite ends by a base or the like movably in the Y-direction, and is moved by moving devices at the opposite ends, respectively. The moving devices for moving the opposite ends of the frame are required to move the opposite ends of the frame accurately in synchronism, and if this requirement is not met, a difference in the amount of movement occurs between one end side and the other end side of the frame.

Generally, since the frame is disposed in such a manner as to be slidably fitted to guide rails provided on the base, and is moved in the Y-direction while being guided by the guide rails, if a difference in the amount of movement occurs as described above, the frame scuffs against or seizes or locks on the guide rails, which makes it impossible to effect smooth movement of the frame. Since the frame and the guide rails are fitted to each other with almost no clearance so as to attain accurate movement in the Y-direction, even if a very small difference occurs in the amount of movement at the opposite ends of the frame, there is a possibility of the occurrence of the above-described drawback.

The present invention has been devised in view of the above-described aspects, and its object is to provide a lass-plate working apparatus which is capable of effecting smooth movement of the frame even if a very small difference occurs in the amount of movement at the opposite ends of the frame.

DISCLOSURE OF THE INVENTION

In accordance with the present invention, the above object is attained by a glass-plate working apparatus comprising: a base on which a glass plate to be worked is placed; a pair of Y-direction movable bases which are spaced apart from each other in an X-direction and are supported movably in a Y-direction perpendicular to the X-direction; a Y-direction moving device for moving the pair of movable bases in the Y-direction; a frame which is supported by the pair of Y-direction movable bases via scuffing preventing devices which are respectively provided in correspondence with the Y-direction movable bases; and a working head mounted on the frame and adapted to work the glass plate placed on the base.

In a preferred example, each of the scuffing preventing devices in accordance with the present invention may be provided with a rotating permitting device so as to allow the frame to rotate in an X-Y plane with respect to a corresponding one of the Y-direction movable bases, the rotating permitting device may be provided with a shaft and a bearing for rotatably supporting the shaft, wherein the shaft and the bearing may be provided on the Y-direction movable base and the frame, respectively, or the shaft and the bearing may be provided on the frame and the Y-direction movable base, respectively.

As preferred examples of the Y-direction moving device, it is possible to cite, among others, one which is provided with a pair of threaded shafts which are rotatably provided on the base in such a manner as to extend in the Y-direction; nuts which are respectively engaged threadedly on the pair of threaded shafts and are respectively provided on the Y-direction movable bases; a rotatively driving means such as an electric motor for rotating the pair of threaded shafts, respectively; and a controlling means for controlling the rotatively driving means so as to rotate the two threaded shafts in synchronism with each other, and one which is provided with a pair of threaded shafts which are fixed in such a manner as to extend in the Y-direction; nuts which are respectively engaged threadedly on the pair of threaded shafts and are respectively provided rotatably on the Y-direction movable bases; rotatively driving means which are respectively provided on the Y-direction movable bases so as to rotate the nuts; and a controlling means for controlling the rotatively driving means so as to rotate the two nuts in synchronism with each other. In the latter example, the pair of threaded shafts may be respectively fixed to and supported by the base at their opposite ends.

In addition, as a further preferred example of the Y-direction moving device, it is possible to cite one which is provided with a pair of electric linear motors, which are respectively provided with a pair of stator rows having stators arrayed in the Y-direction and fixed to the base, and movable elements which are respectively provided on the Y-direction movable bases in such a manner as to be magnetically coupled with the stators of the pair of stator rows. In the case of this example, the Y-direction moving device may be further provided with a means for allowing the pair of electric linear motors to be operated in synchronism with each other.

As a still further preferred example of the Y-direction moving device, it is possible to cite one which is provided with a pair of toothed racks which are fixedly provided on the base in such a manner as to extend in the Y-direction, pinions which are respectively provided on the Y-direction movable bases in meshing engagement with the pair of toothed racks, a rotatively driving means such as an electric motor for rotating the pinions, respectively, and a controlling means for controlling the rotatively driving means so as to rotate the two pinions in synchronization with each other.

As a preferred example of the base, it is possible to cite one which is provided with a pair of lateral bases and guide rails which are respectively provided on the pair of lateral bases in such a manner as to extend in the Y-direction, and each of the Y-direction movable base is provided with a movable base body and a slider member provided on the movable base body and is fitted to a corresponding one of the guide rails slidably in the Y-direction.

In the present invention, the working head may be fixedly provided on the frame so as to move the base in the X-direction. Alternatively, however, the working head may be mounted on the frame via an X-direction movable base which is supported by the frame movably in the X-direction, and the X-direction movable base may be adapted to move in the X-direction by an X-direction moving device.

The X-direction moving device may be arranged by comprising a threaded shaft, a nut which is threadedly engaged on the threaded shaft, and a rotatively driving means for rotating the threaded shaft or the nut. Alternatively, the X-direction moving device may be arranged by comprising an electric linear motor which is provided with a stator row having stators arrayed in the X-direction and fixed to the frame, and a movable element which is provided on the X-direction movable base in such a manner as to be magnetically coupled with the stators of the stator row. Still alternatively, the X-direction moving device may be arranged by comprising a toothed rack, a pinion which meshes with the toothed rack, and a rotatively driving means for rotating the pinion.

The glass-plate working apparatus in accordance with the present invention can be suitably used such as for forming a cut line for bend-breaking in a glass plate, for bend-breaking the glass plate on which the cut line has been formed, for grinding and/or polishing a bend-broken edge of the bend-broken glass plate, or concurrently effecting these operations continuously, for effecting taper edge working, round edge working, or the like at the edge of the glass plate, or effecting other working such as surface grinding and/or polishing work at the surface of the glass plate.

In accordance with the present invention, it is possible to provide a glass-plate working apparatus which is capable of effecting smooth movement of the frame even if a very small difference occurs in the amount of movement at the opposite ends of the frame, thereby making it possible to effect very accurate working with respect to the glass plate.

Hereafter, a more detailed description will be given of the present invention on the basis of preferred embodiments illustrated in the drawings. It should be noted that the present invention is not limited to these embodiments.

EMBODIMENTS

Figure 1:
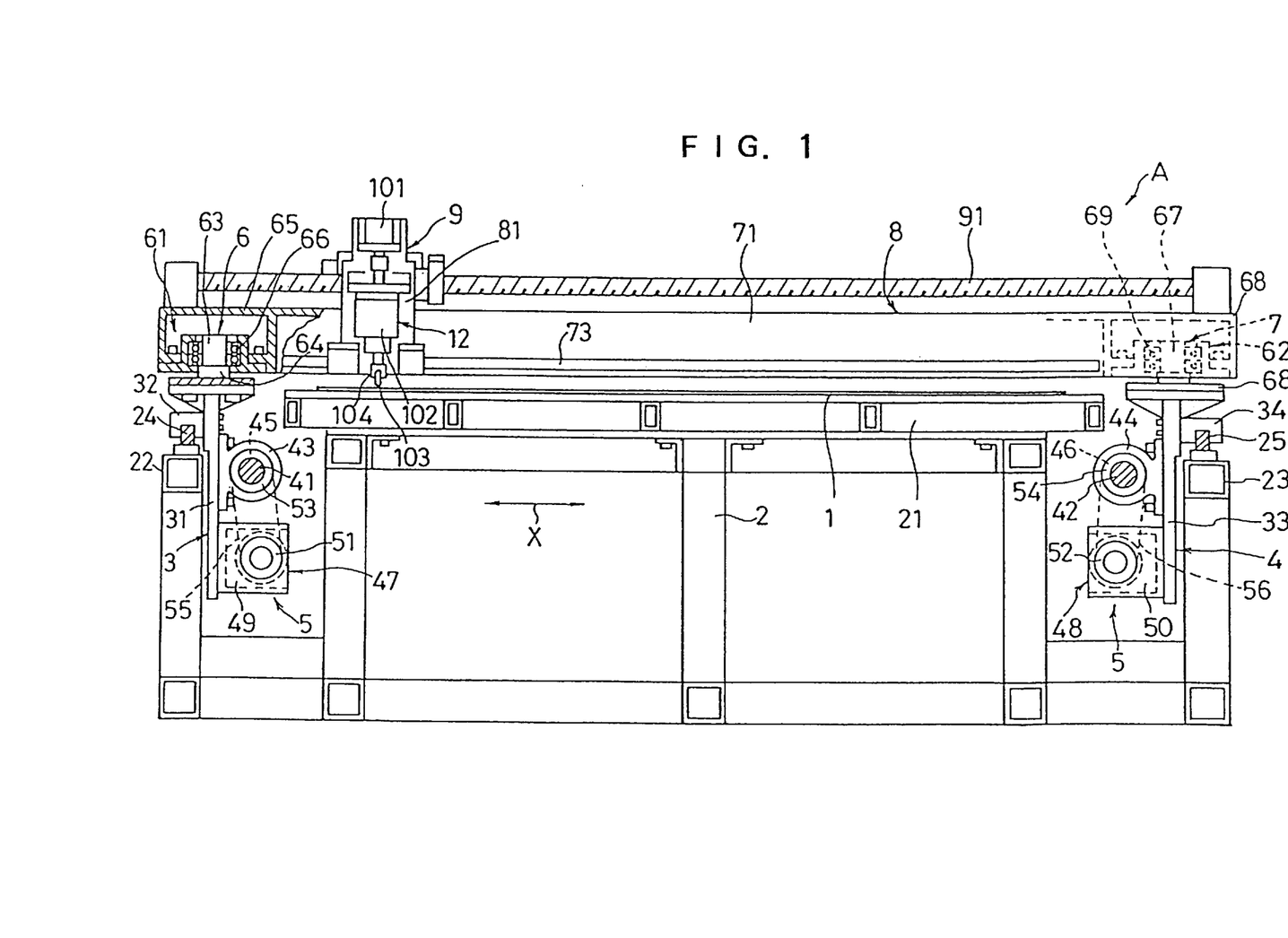
FIG. 1 is a front elevational view of a preferred embodiment of the present invention.
Figure 2:
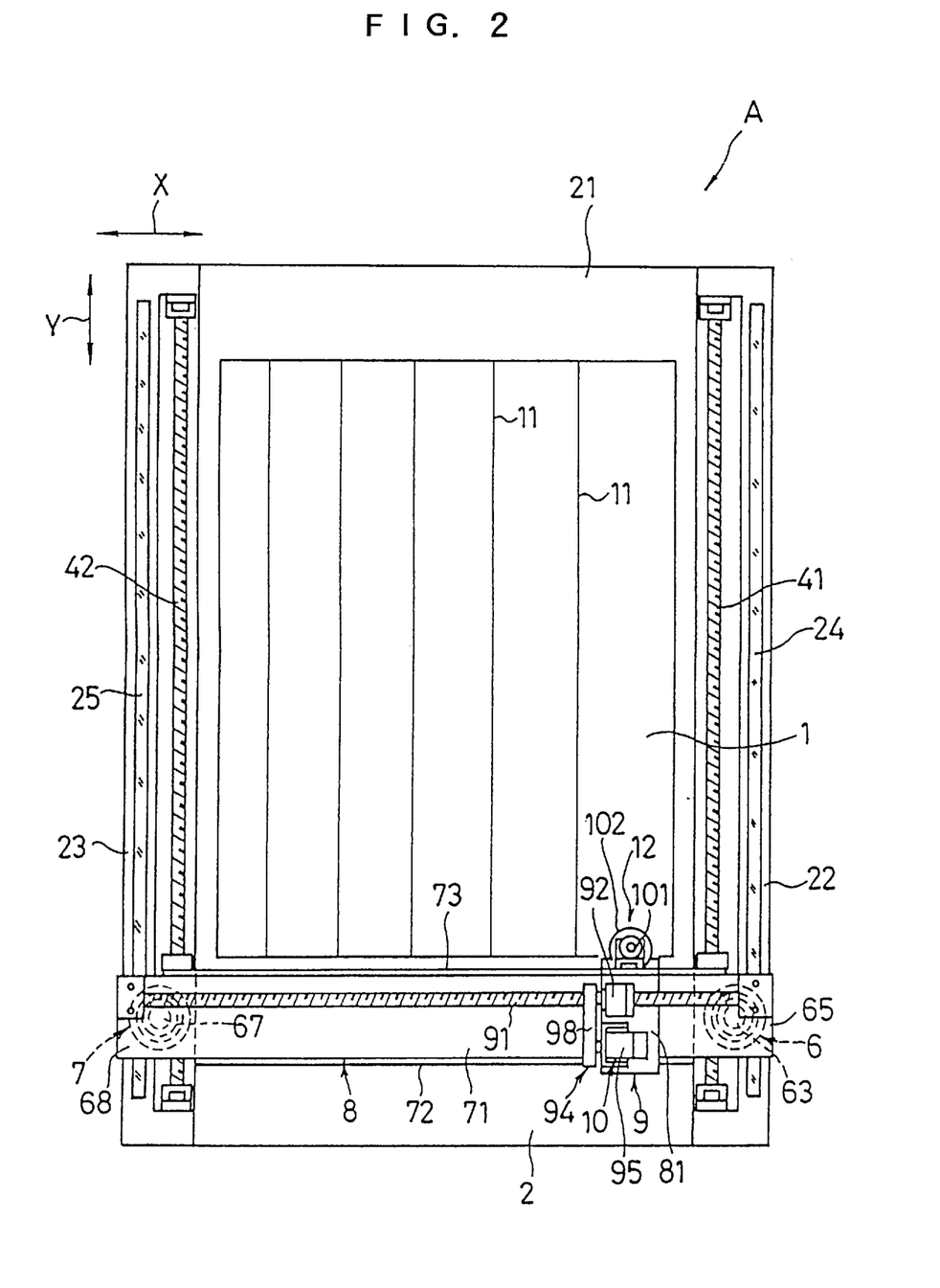
FIG. 2 is a plan view of the embodiment shown in FIG. 1.
Figure 3:
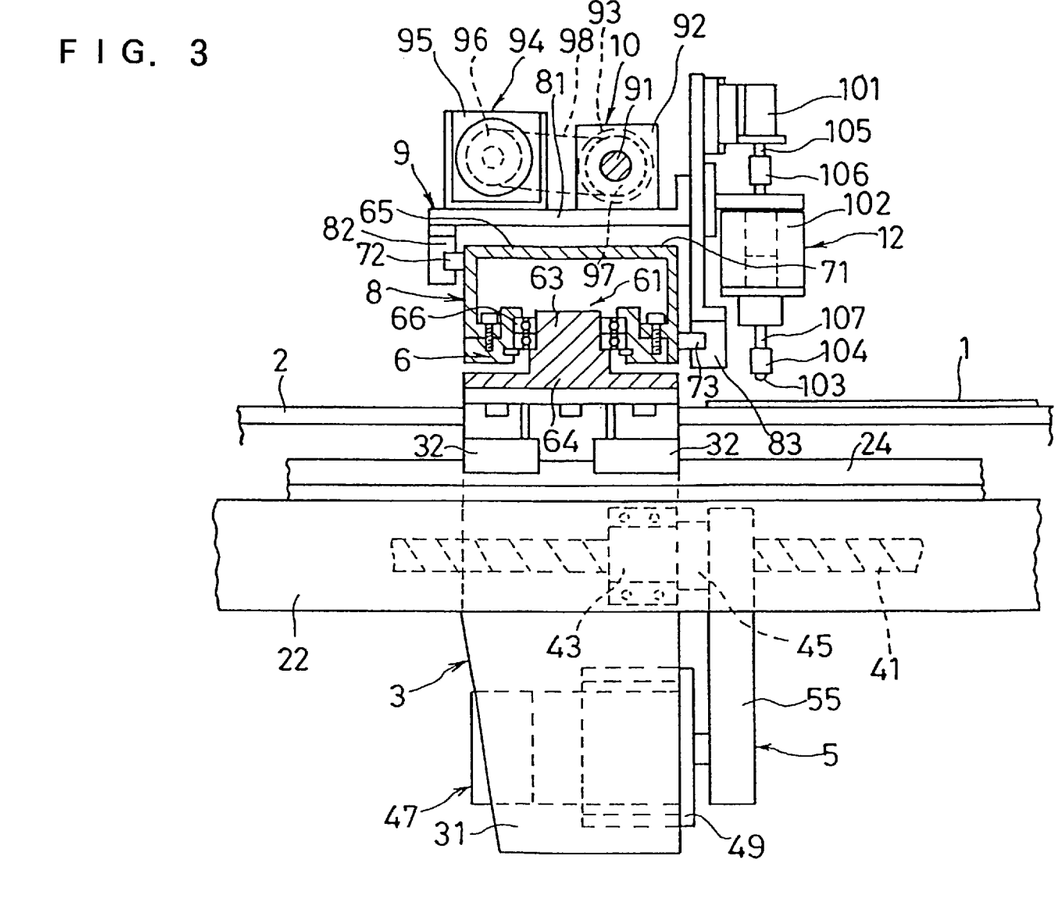
FIG. 3 is a partial detailed diagram of the embodiment shown in FIG. 1.

In FIGS. 1 to 3, a glass-plate working apparatus A in accordance with this embodiment comprises a base 2 on which a glass plate 1 to be worked is placed; a pair of Y-direction movable bases 3 and 4 which are spaced apart from each other in the X-direction and are supported by the base 2 movably in the Y-direction perpendicular to the X-direction; a Y-direction moving device 5 for moving the pair of movable bases 3 and 4 in the Y-direction; a frame 8 which is supported by the pair of Y-direction movable bases 3 and 4 via scuffing preventing devices 6 and 7 which are respectively provided in correspondence with the Y-direction movable bases 3 and 4; an X-direction movable base 9 which is supported by the frame 8 movably in the X-direction; an X-direction moving device 10 for moving the X-direction movable base 9 in the X-direction; and a working head 12 mounted on the X-direction movable base 9 so as to work the glass plate 1 placed on the base 2, i.e., to form a cut line 11 for bend-breaking in this example.

The base 2 is provided with a base body 21 constituting a placing table for the glass plate 1; a pair of lateral bases 22 and 23 disposed on both sides of the base body 21; and guide rails 24 and 25 which are respectively provided on the upper surface of the pair of lateral bases 22 and 23 in such a manner as to extend in the Y-direction.

The pair of Y-direction movable bases 3 and 4 are arranged in a mutually similar manner, and the Y-direction movable base 3 is provided with a movable base body 31 and a slider member 32 which is provided on the movable base body 31 and is fitted to the corresponding guide rail 24 slidably in the Y-direction, while the Y-direction movable base 4 is provided with a movable base body 33 and a slider member 34 which is provided on the movable base body 33 and is fitted to the corresponding guide rail 25 slidably in the Y-direction.

The Y-direction moving device 5 is provided with a pair of threaded shafts 41 and 42 which are respectively fixed to and supported by the lateral bases 22 and 23 of the base 2 at their opposite ends in such a manner as to extend in the Y-direction; nuts 45 and 46 which are respectively engaged threadedly on the pair of threaded shafts 41 and 42 and are respectively provided rotatably on the movable base bodies 31 and 33 of the Y-direction movable bases 3 and 4 via bearings 43 and 44; rotatively driving means 47 and 48 which are respectively provided on the movable base bodies 31 and 33 so as to rotate the nuts 45 and 46; and a controlling means (not shown) for controlling the rotatively driving means 47 and 48 so as to rotate the two nuts 45 and 46 in synchronism with each other.

The rotatively driving means 47 and 48 are arranged in a similar manner, and are respectively provided with electric motors 49 and 50 supported by the movable base bodies 31 and 33, respectively; toothed pulleys 51 and 52 which are secured to output rotating shafts of the electric motors 49 and 50, respectively; toothed pulleys 53 and 54 which are respectively formed integrally with the nuts 45 and 46; and timing belts 55 and 56 which are respectively trained between the respective pulleys 51 and 52 and the respective pulleys 53 and 54.

The Y-direction moving device 5 is arranged such that the output rotating shafts of the electric motors 49 and 50 are rotated by the synchronous operation of the electric motors 49 and 50 by means of the controlling means, which in turn causes the nuts 45 and 46 to rotate via the pulleys 51 and 52, the timing belts 55 and 56, and the pulleys 53 and 54, and the synchronous rotation of the nuts 45 and 46 causes the respective Y-direction movable bases 3 and 4 to move synchronously in the Y-direction in a similar manner. At this time, the movement of each of the Y-direction movable bases 3 and 4 in the Y-direction is guided by each of the guide rails 24 and 25 to which the slider members 32 and 34 are fitted slidably in the Y-direction. It should be noted that, as each of the threaded shafts 41 and 42 and each of the nuts 45 and 46, it is possible to use a combination of a ball screw and a nut in which each of the nuts 45 and 46 is threadedly engaged on each of the threaded shafts 41 and 42 via a multiplicity of balls (steel balls).

The scuffing preventing devices 6 and 7 are arranged in a similar manner, and are respectively provided with rotation permitting devices 61 and 62 for allowing the frame 8 to rotate in the X-Y plane on the respective Y-direction movable bases 3 and 4 with respect to the corresponding Y-direction movable bases.

The rotation permitting device 61 is provided with a shaft member 64 having a shaft 63 and attached to the movable base body 31; and a bearing 66 for rotatably supporting the shaft 63 and attached to one end 65 of the frame 8. The rotation permitting device 62 is provided with a shaft member 68 having a shaft 67 and attached to the movable base body 33; and a bearing 69 for rotatably supporting the shaft 67 and attached to the other end 68 of the frame 8.

The frame 8 is supported on its one end 65 side by the Y-direction movable base 3 in such a manner as to be rotatable in the X-Y plane via the rotation permitting device 61, and is supported on its other end 68 side by the Y-direction movable base 4 in such a manner as to be rotatable similarly in the X-Y plane via the rotation permitting device 62.

It should be noted that although, in this example, the shafts 63 and 67 are respectively provided on the Y-direction movable bases 3 and 4, and the bearings 66 and 69 are provided on the frame 8, instead of this arrangement the shafts 63 and 67 may be provided on the frame 8, and the bearings 66 and 69 may be respectively provided on the Y-direction movable bases 3 and 4. In addition, the bearings may be constituted by other types of bearings, e.g., cylindrical slide bearings, instead of the illustrated ball bearings.

The frame 8 bridges the pair of Y-direction movable bases 3 and 4, extends in the X-direction above the base 2, and is provided with a frame body 71 and guide rails 72 and 73 provided on side surfaces of the frame body 71 in such a manner as to extend in the X-direction.

The X-direction movable base 9 is provided with a movable base body 81 and slider members 82 and 83 which are provided on the movable base body 81 and are fitted to the guide rails 72 and 73 slidably in the X-direction.

The X-direction moving device 10 is provided with a threaded shaft 91 which is fixed to and supported by the frame body 71 at its opposite ends in such a manner as to extend in the X-direction; a nut 93 which is threadedly engaged on the threaded shaft 91 and is rotatably provided on the movable base body 81 of the X-direction movable base 9 via a bearing 92; a rotatively driving means 94 which is provided on the movable base body 81 so as to rotate the nut 93; and the controlling means (not shown) for controlling the rotatively driving means 94.

The rotatively driving means 94 is provided with an electric motor 95 supported by the movable base body 81; a toothed pulley 96 secured to an output rotating shaft of the electric motor 95; a toothed pulley 97 formed integrally with the nut 93; and a timing belt 98 trained between the pulleys 96 and 97.

The X-direction moving device 10 is arranged such that the output rotating shaft of the electric motor 95 is rotated by the operation of the electric motor 95 by means of the controlling means, which in turn causes the nut 93 to rotate via the pulley 96, the timing belt 98 and the pulley 97, and the rotation of the nut 93 causes the X-direction movable base 9 to move in the X-direction. At this time, the movement of the X-direction movable base 9 in the X-direction is guided by the guide rails 72 and 73 to which the slider members 82 and 83 are respectively fitted slidably in the X-direction. It should be noted that, as the threaded shaft 91 and the nut 93, it is possible to use a combination of a ball screw and a nut in which the nut 93 is threadedly engaged on the threaded shaft 91 via a multiplicity of balls (steel balls), in the same way as described above.

The working head 12 is provided with a pneumatically operated cylinder unit 101 and an electric motor 102 which are respectively provided on the movable base body 81 of the X-direction movable base 9; and a cutter block 104 to which a cutter wheel 103 is rotatably attached. A piston rod 105 of the cylinder unit 101 is coupled to a rotating shaft 107 of the electric motor 102 via a coupler 106, and the cutter block 104 is attached to a lower end of the rotating shaft 107. The working head 12 is arranged such that, when the cut line 11 is formed, the cylinder unit 101 is operated to extend the piston rod 105, the cutter wheel 103 is thereby pressed against the glass plate 1, the electric motor 102 is operated to rotate the rotating shaft 107, and the blade of the cutter wheel is oriented in the direction in which the cut line is formed.

It should be noted that the glass-plate working apparatus A further has a numerical controller which also functions as the controlling means for the Y-direction moving device 5 and the X-direction moving device 10 and controls the operation of the working head 12. The operation described above and below is effected by a program which is stored in advance in this numerical controller.

With the above-described glass-plate working apparatus A, the Y-direction movable bases 3 and 4 are respectively moved in the Y-direction by the operation of the Y-direction moving device 5, and as the frame 8 is moved in the Y-direction, the working head 12 is moved similarly in the Y-direction. At the same time, the cutter wheel 103 is pressed against the glass plate 1 by the operation of the pneumatically operated cylinder unit 101 and the electric motor 102, and its edge is oriented in the cut-line forming direction, thereby forming the cut line 11 on the glass plate 1. After the formation of one cut line 11, the X-direction movable base 9 is moved in the X-direction by the operation of the X-direction moving device 10, and the working head 12 is moved similarly in the X-direction, whereby the working head 12 is moved to an ensuing cut-line forming position in the X-direction. Thereafter, an ensuing cut line 11 is formed in the same way as described above by the operation of the Y-direction moving device 5 and the like.

With the glass-plate working apparatus A in this embodiment, since the frame body 71 is attached to the Y-direction movable bases 3 and 4 via the rotation permitting devices 61 and 62, respectively, at its opposite ends 65 and 68, even if there is a slight error (difference) in the amount of movement of the opposite ends 65 and 68 of the frame body 71, or even if there is a slight delay or advance in the movement of one end 65 of the frame body 71 with respect to the other end 68, i.e., even if there is a slight error (difference) in the amount of movement of the Y-direction movable bases 3 and 4, or even if there is a slight delay or advance in the movement of the Y-direction movable base 3 with respect to the Y-direction movable base 4, since each of the opposite ends 65 and 68 of the frame body 71 is capable of rotating in the X-Y plane with respect to each of the Y-direction movable bases 3 and 4, it is possible to prevent the scuffing of at least one of the slider members 32 and 34 of the Y-direction movable bases 3 and 4 against the corresponding one of the guide rails 24 and 25, thereby making it possible to smoothly move the frame 8 in the Y-direction. Accordingly, even if the state in which the slider members 32 and 34 are slidably fitted to the respective guide rails 24 and 25 is set in a closely fitted state, it is possible to ensure smooth movement of the frame 8 and form the cut line 11 very accurately.

Although the working head 12 shown in the above example is adapted to form the cut line 11 for bend-breaking, the present invention is not limited to the same, and other working heads such as a bend-breaking head and a grinding/polishing head may be used. Further, although the Y-direction moving device 5 and the X-direction moving device 10 are arranged such that nuts are rotated to move the Y-direction movable bases 3 and 4 and the X-direction movable base 9, respectively, an arrangement may be alternatively provided such that the nuts may be provided fixedly on the respective movable bases, and the threaded shafts which are threadedly engaged with the nuts are rotated to move the Y-direction movable bases 3 and 4 and the X-direction movable base 9 in the Y-direction and the X-direction, respectively.

Figure 4:
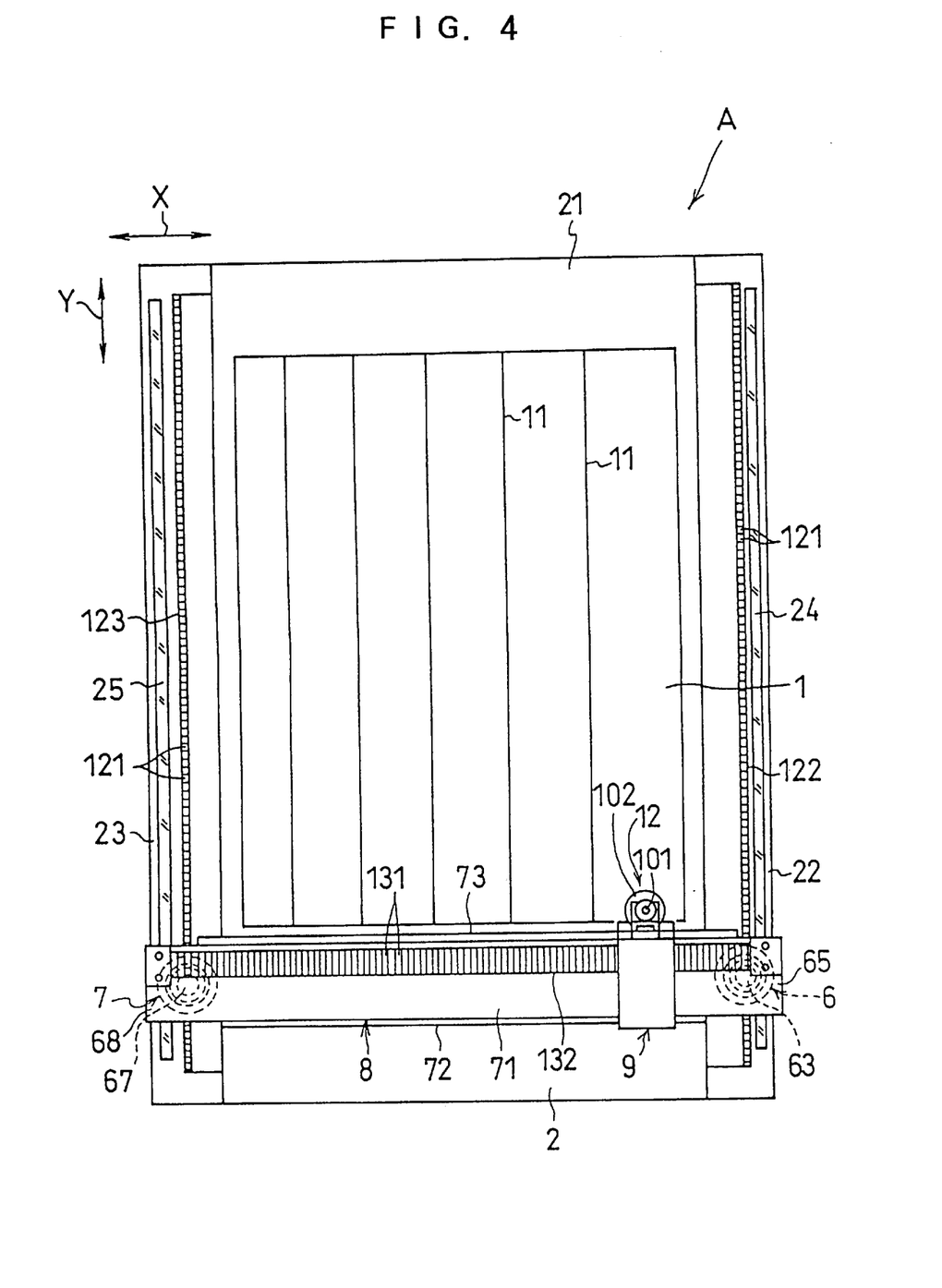
FIG. 4 is a plan view of another preferred embodiment of the present invention.
Figure 5:
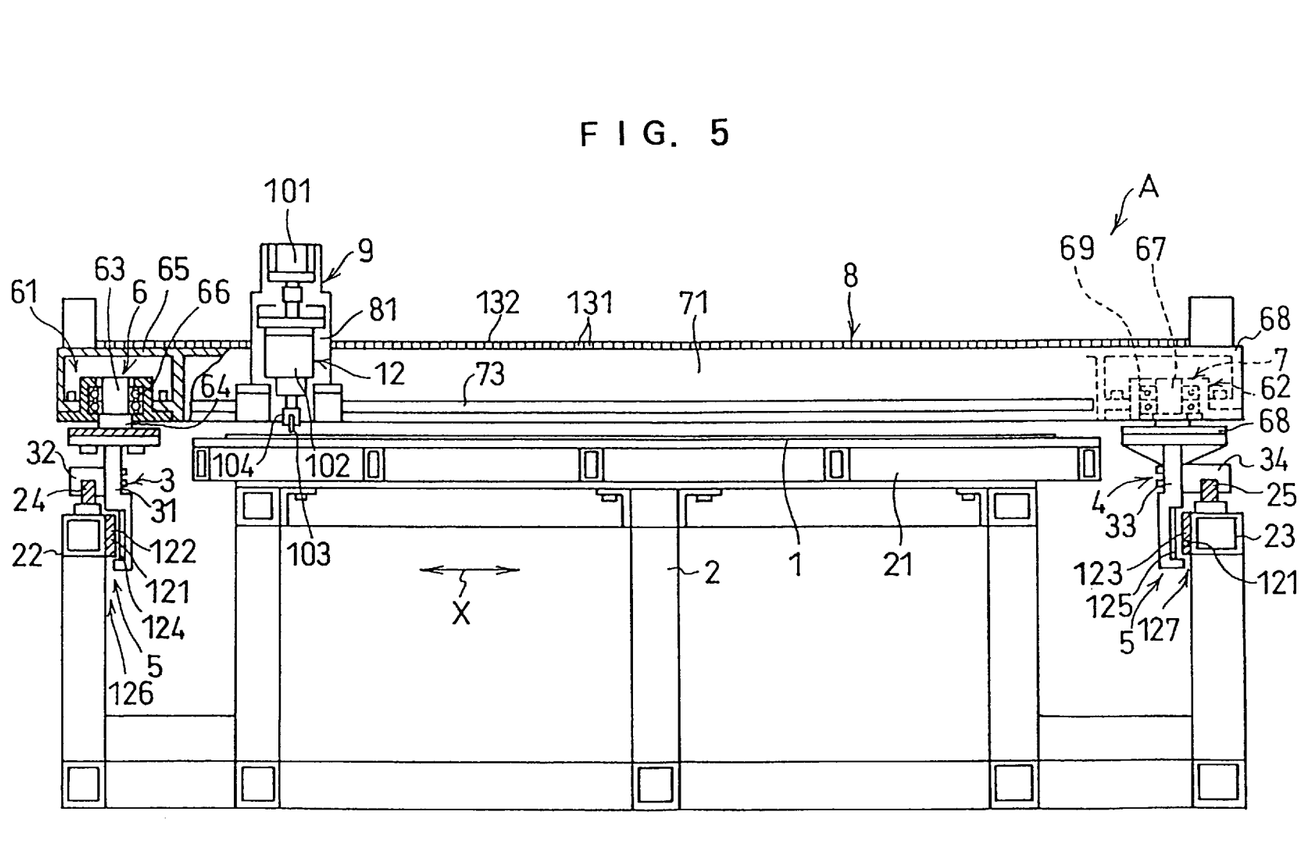
FIG. 5 is a front elevational view of the embodiment shown in FIG. 4.
Figure 6:
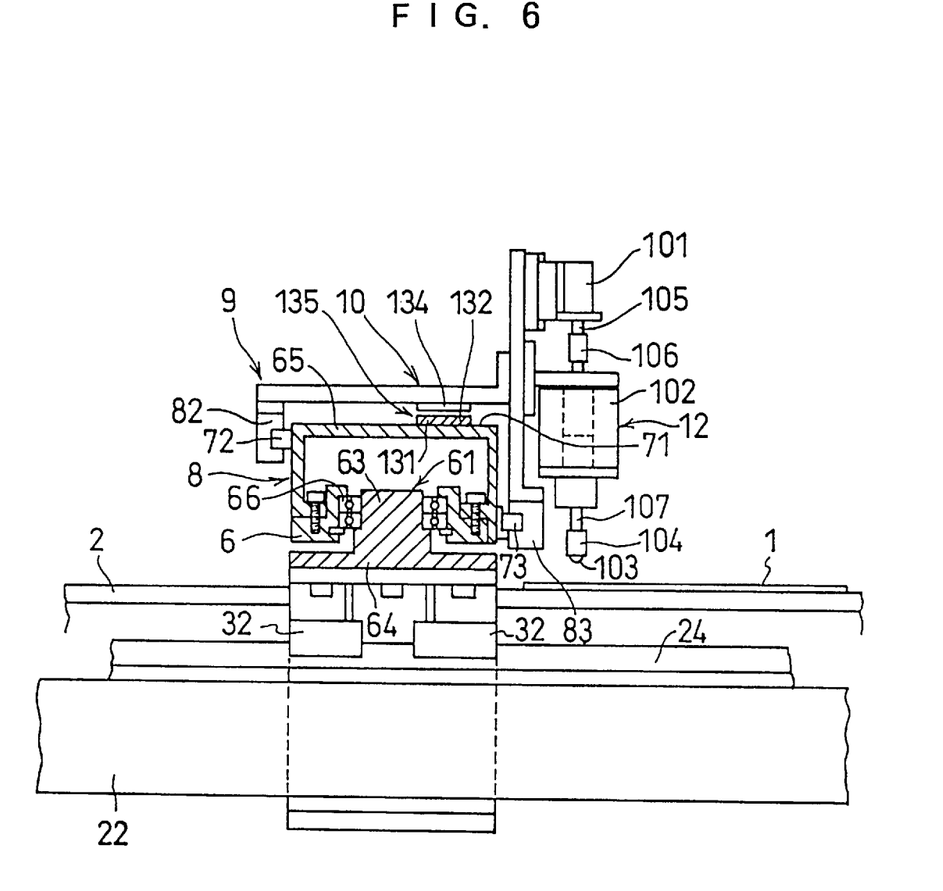
FIG. 6 is a partial detailed diagram of the embodiment shown in FIG. 4.

In addition, although in the above-described example the Y-direction moving device 5 is arranged by comprising the threaded shafts 41 and 42, the nuts 45 and 46 engaged threadedly on the threaded shafts 41 and 42, the rotatively driving means 47 and 48 for rotating the nuts 45 and 46, and the like, while the X-direction moving device 10 is arranged by comprising the threaded shaft 91, the nut 93 engaged threadedly on the threaded shaft 91, the rotatively driving means 94 for rotating the nut 93, and the like, the Y-direction moving device 5 and the X-direction moving device 10 may be alternatively arranged as shown in FIGS. 4 to 6.

In FIGS. 4 to 6, the Y-direction moving device 5 is arranged by comprising a pair of electric linear motors 126 and 127, which are respectively provided with a pair of stator rows 122 and 123 having stators 121 arrayed in the Y-direction and fixed respectively to the lateral bases 22 and 23 of the base 2, and movable elements 124 and 125 which are respectively provided on the movable base bodies 31 and 33 of the Y-direction movable bases 3 and 4 in such a manner as to be magnetically coupled with the stators 121 of the pair of stator rows 122 and 123 consecutively. Further, the Y-direction moving device 5 is provided with a means (not shown) for allowing the pair of electric linear motors 126 and 127 to be operated in synchronism with each other.

The Y-direction moving device 5 comprised of the linear motors 126 and 127 synchronously moves the movable base bodies 31 and 33 in the Y-direction through the magnetic action between the movable elements 124 and 125 and the stator 121 of the stator rows 122 and 123 which is based on the controlled supply of electric current to, for instance, the movable elements 124 and 125.

In addition, in FIGS. 4 to 6, the X-direction moving device 10 is comprised of an electric linear motor 135, which is provided with a stator row 132 having stators 131 arrayed in the X-direction and fixed to the frame 8 and a movable element 134 provided on the X-direction movable base 9 in such a manner as to be magnetically coupled with the stators 131 of the stator row 132 consecutively, as well as a controlling means (not shown) for controlling the electric linear motor 135.

The X-direction moving device 10 comprised of the linear motor 135 moves the X-direction movable base 9 in the X-direction through the magnetic action between the movable element 134 and the stators 131 of the stator row 132 which is based on the controlled supply of electric current to the movable element 134 by the controlling means.

If the Y-direction moving device 5 and the X-direction moving device 10 are respectively arranged by the linear motors 126 and 127 and the linear motor 135 as described above, it is possible to obtain an effect similar to the one described above. In addition, it is possible to overcome, among others, the drawback ascribable to the threaded shafts and the nuts engaged threadedly on the threaded shafts as well as the drawback ascribable to the threaded shafts or the rotation of the nuts, thereby making it possible to effect the glass-plate working more efficiently.

I claim:

1. A glass-plate working apparatus for working a glass-plate comprising:

a base means on which a glass plate to be worked is placed;

a pair of Y-direction movable bases which are spaced apart from each other in an X-direction and are supported movably in a Y-direction perpendicular to the X-direction;

a Y-direction moving device for moving said pair of movable bases in the Y-direction;

scuffing preventing devices respectively provided in correspondence with said Y-direction movable bases;

a frame which is supported by said pair of Y-direction movable bases via said scuffing preventing devices; and a working head mounted on said frame for working the glass plate when placed on said base means, wherein each of said scuffing preventing devices includes a rotating permitting device for allowing said frame to rotate in an X-Y plane with respect to a corresponding one of said Y-direction movable bases.

2. A glass-plate working apparatus according to claim 1, wherein said rotating permitting device includes a shaft and a bearing for rotatably supporting said shaft.

3. A glass-plate working apparatus according to claim 2, wherein said shaft and said bearing are provided on said Y-direction movable base and said frame, respectively.

4. A glass-plate working apparatus according to claim 2, wherein said shaft and said bearing are provided on said frame and said Y-direction movable base, respectively.

5. A glass-plate working apparatus according to claim 1, wherein said Y-direction moving device includes a pair of threaded shafts which are fixed in such a manner as to extend in the Y-direction; nuts which are respectively engaged threadedly on said pair of threaded shafts and are respectively provided rotatably on said Y-direction movable bases; and rotatively driving means respectively provided on said Y-direction movable bases for rotating said nuts in synchronism with each other.

6. A glass-plate working apparatus according to claim 5, wherein said pair of threaded shafts are respectively fixed to and supported by said base at their opposite ends.

7. A glass-plate working apparatus according to claim 1, wherein said Y-direction moving device includes a pair of electric linear motors, which respectively comprise a pair of stator rows having stators arrayed in the Y-direction and fixed to said base means, and movable elements which are respectively provided on said Y-direction movable bases in such a manner as to be magnetically coupled with said stators of said pair of stator rows, said pair of electric linear motors being operated in synchronism with each other.

8. A glass-plate working apparatus according to claim 1, wherein said base means includes a pair of lateral bases and guide rails which are respectively provided on said pair of lateral bases in such a manner as to extend in the Y-direction, and each of said Y-direction movable bases includes a movable base body and a slider member provided on said movable base body and fitted to a corresponding one of said guide rails slidably in the Y-direction.

9. A glass-plate working apparatus according to claim 1, further comprising an X-direction movable base which is supported by said frame movably in the X-direction, and an X-direction moving device for moving said X-direction movable base in the X-direction, said working head being mounted on said frame via said X-direction movable base.

10. A glass-plate working apparatus according to claim 9, wherein said X-direction moving device includes an electric linear motor which comprises a stator row having stators arrayed in the X-direction and fixed to said frame, and a movable element which is provided on said X-direction movable base in such a manner as to be magnetically coupled with said stators of said stator row.

* * * * *